(12) United States Patent
Kitami et al.

(10) Patent No.: US 7,356,342 B2
(45) Date of Patent: Apr. 8, 2008

(54) WIRELESS LAN BASE STATION AND COMMUNICATION CONTROL METHOD AT WIRELESS LAN BASE STATION

(75) Inventors: Hideo Kitami, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 726 days.

(21) Appl. No.: 10/715,442

(22) Filed: Nov. 19, 2003

(65) Prior Publication Data

US 2004/0117432 A1 Jun. 17, 2004

(30) Foreign Application Priority Data

Nov. 29, 2002 (JP) ............... 2002-348067

(51) Int. Cl.
*H04Q 7/20* (2006.01)
(52) U.S. Cl. .................. 455/453; 455/455; 455/452.1; 455/452.2
(58) Field of Classification Search ................ 370/338, 370/349, 310.2, 313, 328, 334
See application file for complete search history.

(56) References Cited

U.S. PATENT DOCUMENTS 6,259,898 B1 * 7/2001 Lewis ................... 455/103

2003/0048768 A1 * 3/2003 Nakamura et al. .......... 370/338

FOREIGN PATENT DOCUMENTS

| JP | 06-178352 | 6/1994 |
|---|---|---|
| JP | 06-245260 | 9/1994 |
| JP | 08-256162 | 10/1996 |
| JP | 2002-112324 | 2/2002 |
| JP | 2002-246969 | 8/2002 |

\* cited by examiner

*Primary Examiner*—Duc M. Nguyen
*Assistant Examiner*—Dai Phuong
(74) *Attorney, Agent, or Firm*—Whitham Curtis Christofferson & Cook, PC

(57) ABSTRACT

This invention provides a wireless LAN base station capable of accommodating all of the client terminal stations if the number of client terminal stations wirelessly connected to the wireless LAN base station increases and capable of reducing power consumption if the number of wireless client terminal stations decreases. This wireless LAN base station includes at least two wireless LAN modules, each of which are capable of holding the wireless communication with at least one client terminal station, a section for detecting the number of client terminal stations that are being holding the wireless communication with the wireless LAN base station; and a section for changing the number of active wireless LAN modules according to the detected number of the client terminal stations.

8 Claims, 18 Drawing Sheets

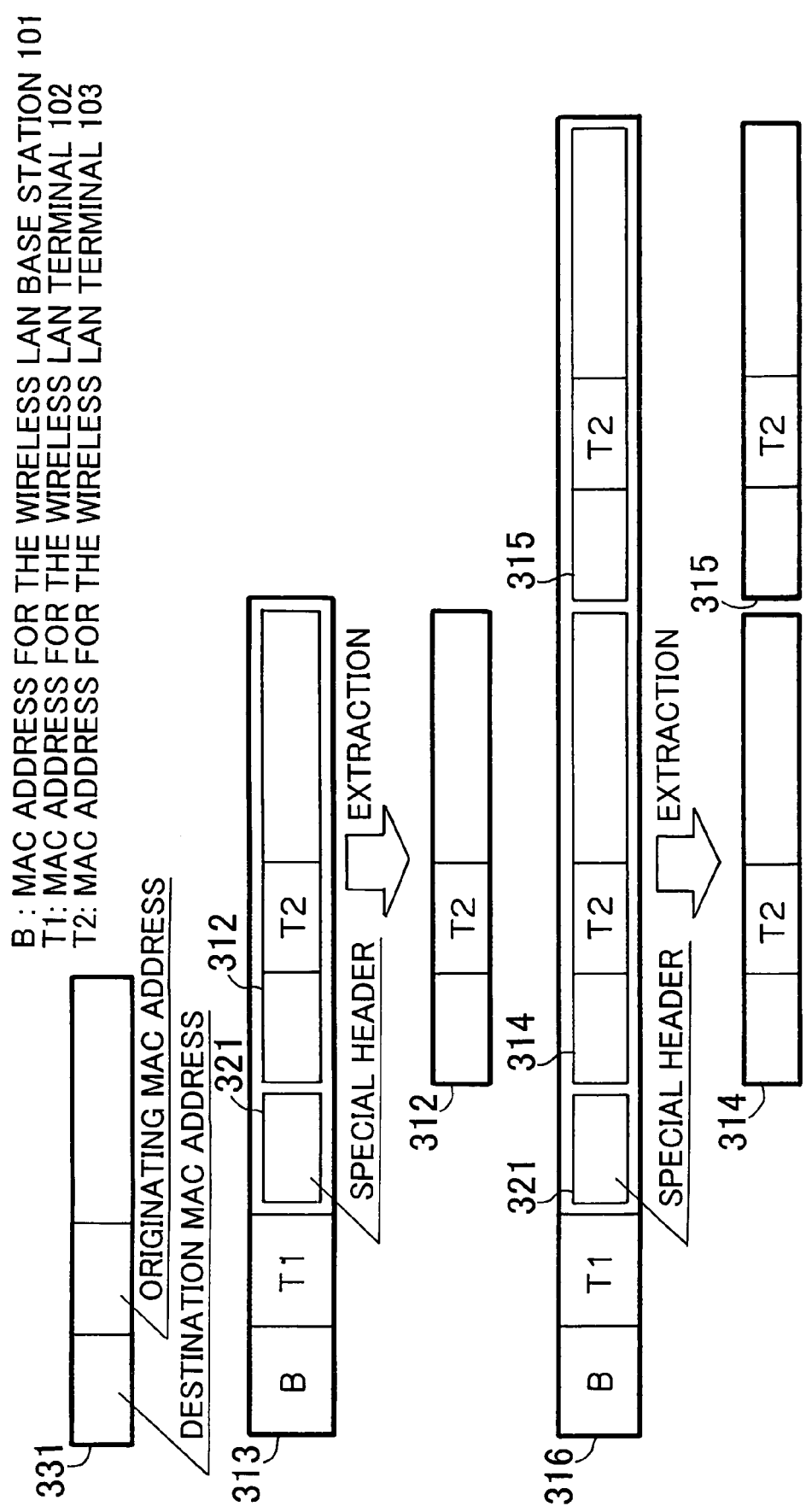

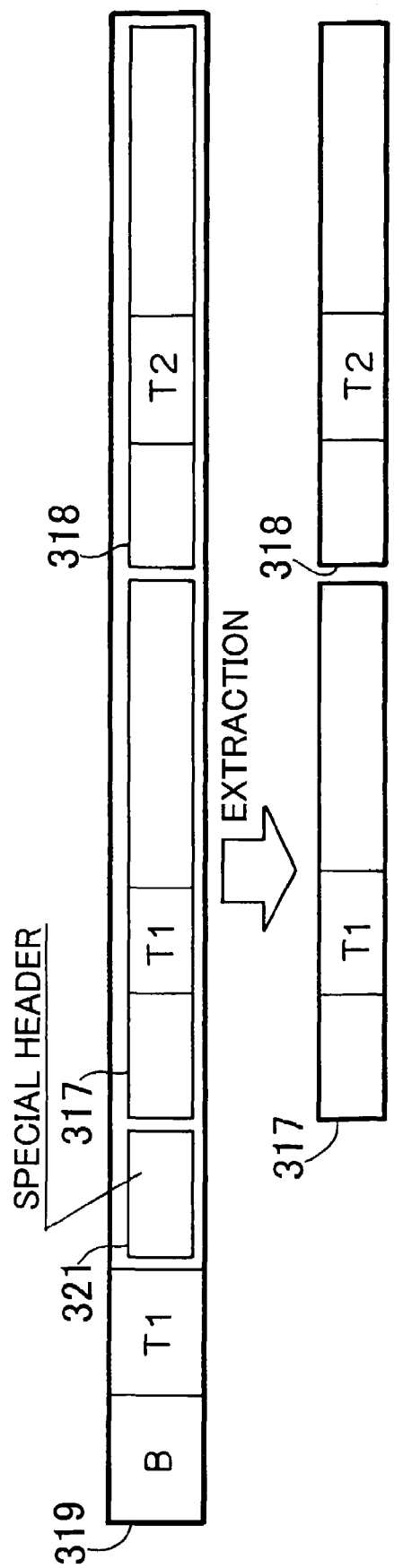

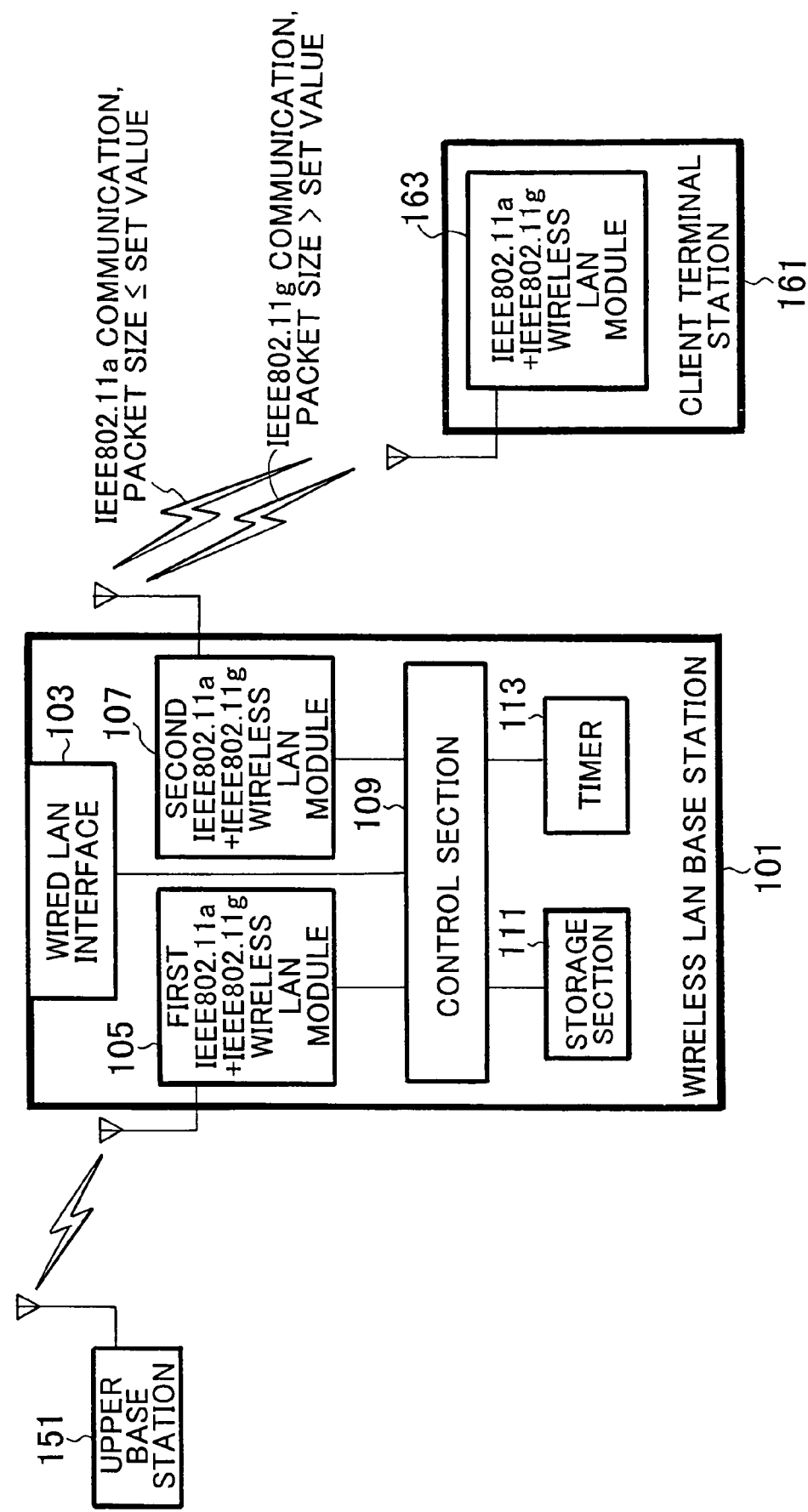

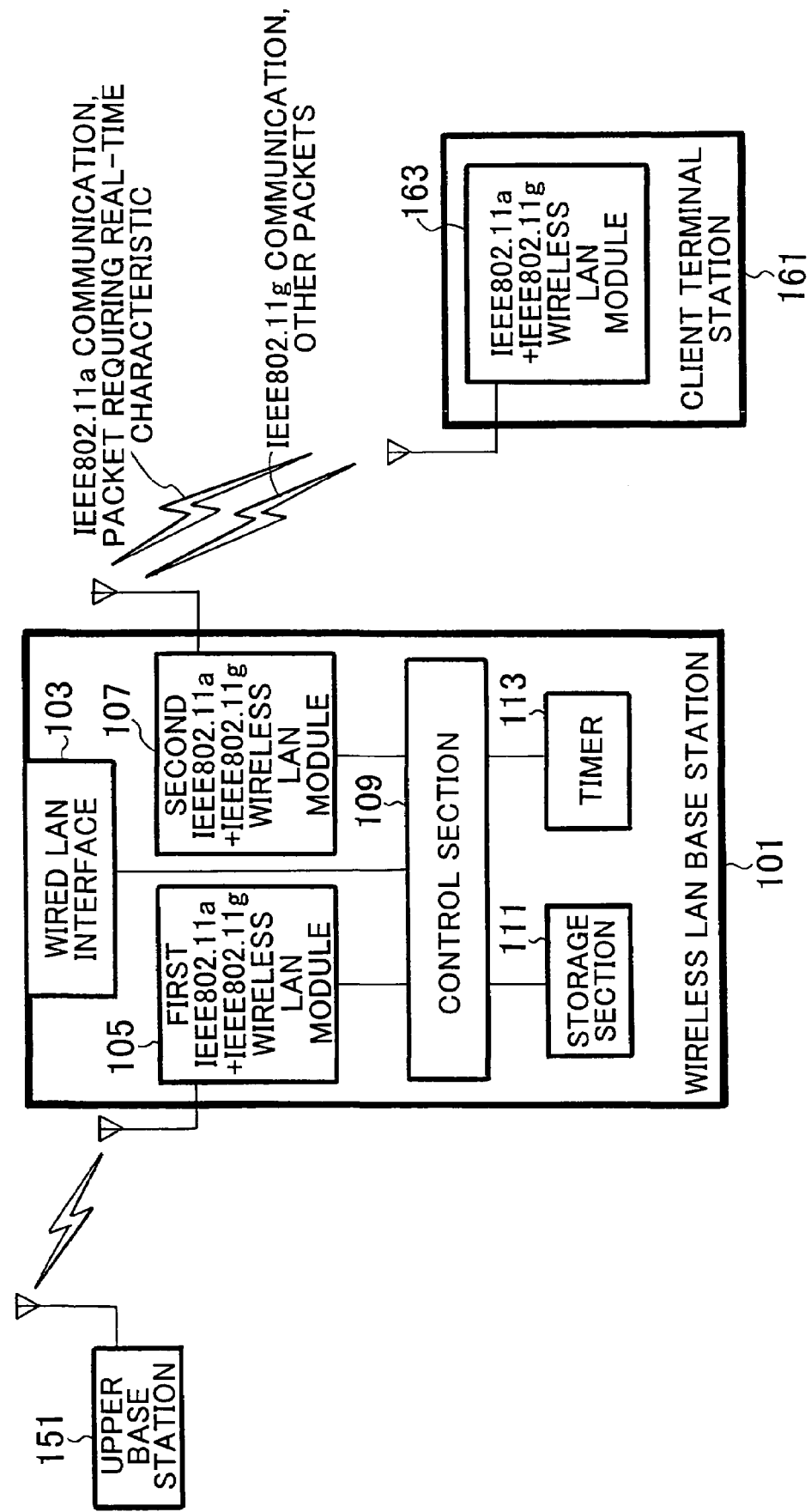

US 7,356,342 B2

WIRELESS LAN BASE STATION AND COMMUNICATION CONTROL METHOD AT WIRELESS LAN BASE STATION

BACKGROUND OF THE INVENTION

1. Field of the Invention

The present invention relates to a wireless LAN (Local Area Network) base station that holds wireless communication with a client terminal station.

2. Description of the Related Art

Conventional LANs were wired LANs based on, for example, IEEE (Institute of Electrical and Electronics Engineers) 802.3 standard. Recently, wireless LANs based on IEEE 802.11 standard have spread.

Prior art documents related to the present invention are as follows:

Japanese Patent Application Laid-Open Publication No. 06-178352;

Japanese Patent Application Laid-Open Publication No. 06-245260;

Japanese Patent Application Laid-Open Publication No. 08-256162; and

Japanese Patent Application Laid-Open Publication No. 2002-246969.

If a wireless LAN is constructed in a company or in a home, the number of client terminal stations wirelessly connected to a wireless LAN base station does not change greatly. However, if a wireless LAN is constructed in, for example, an Internet Café, the number of client terminal stations wirelessly connected to the wireless LAN base station changes as the number of customers increases or decreases.

If the number of wireless LAN modules provided at the wireless LAN base station is determined according to the maximum estimated number of client terminal stations wirelessly connected to the wireless LAN base station, it is possible to deal with the change of the number of client terminal stations. This, however, disadvantageously consumes power and the like if the number of clients terminal stations decreases.

SUMMARY OF THE INVENTION

It is, therefore, an object of the present invention to provide a wireless LAN base station and a communication control method at the wireless LAN base station capable of accommodating all of the client terminal stations if the number of client terminal stations wirelessly connected to the wireless LAN base station increases and capable of reducing power consumption if the number of wireless client terminal stations decreases.

According to a first aspect of the present invention, there is provided a wireless LAN base station which holds wireless communication with at least one client terminal station, the wireless LAN base station comprising: at least two wireless LAN modules, each of which is capable of holding the wireless communication with at least one client terminal station; means for detecting the number of client terminal stations which are being holding the wireless communication with the wireless LAN base station; and means for changing the number of active wireless LAN modules according to the detected number of the client terminal stations.

The wireless LAN base station may comprise: a first wireless LAN module capable of holding the wireless communication with at least one client terminal station; a second wireless LAN module capable of holding the wireless communication with at least one client terminal station; determination means for determining whether the number of the client terminal stations which are holding the wireless communication with the wireless LAN base station is equal to or smaller than a predetermined number; first control means for controlling all of the client terminal stations which are holding the wireless communication with the wireless LAN base station to hold the wireless communication with the first wireless LAN module, controls the first wireless LAN module to be activated and controls the second wireless LAN module to be deactivated, if a determination result of the determination means is YES; and second control means for controlling a part of the client terminal stations which are holding the wireless communication with the wireless LAN base station to hold the wireless communication with the first wireless LAN module, controls the rest of the client terminal stations which are holding the wireless communication with the wireless LAN base station to hold the wireless communication with the second wireless LAN module and controls the first wireless LAN module and the second wireless LAN module to be activated, if the determination result is NO.

In the wireless LAN base station, the first wireless LAN module may comprise a plurality of wireless communication sections based on different wireless communication systems from one another, the second wireless LAN module may comprise a plurality of wireless communication sections based on different wireless communication systems from one another, and the determination means, the first control means, and the second control means may operate according to each of the wireless communication systems.

In the wireless LAN base station, the different wireless communication systems may be used for respective packet sizes.

In the wireless LAN base station, the different wireless communication systems may be allocated for respective packet types.

According to a second aspect of the present invention, there is provided a communication control method at a wireless LAN base station which holds wireless communication with at least one client terminal station, and which comprises at least two wireless LAN modules, each of which is capable of holding the wireless communication with at least one client terminal station, the control method comprising steps of: detecting the number of client terminal stations which are being holding the wireless communication with the wireless LAN base station; and changing the number of active wireless LAN modules according to the detected number of the client terminal stations.

In the communication control method, the wireless LAN base station may comprise: a first wireless LAN module capable of holding the wireless communication with at least one client terminal station; and a second wireless LAN module capable of holding the wireless communication with at least one client terminal station, and wherein the communication control method may comprise: determination step of determining whether the number of the client terminal stations which are holding the wireless communication with the wireless LAN base station is equal to or smaller than a predetermined number; a first control step of controlling all of the client terminal stations which are holding the wireless communication with the wireless LAN base station to hold the wireless communication with the first wireless LAN module, controlling the first wireless LAN module to be activated and controlling the second wireless LAN module to be deactivated, if a determination result of the determination step is YES; and a second control step of controlling a part of the client terminal stations which are holding the wireless communication with the wireless LAN base station to hold the wireless communication with the first wireless LAN module, controlling the rest of the client terminal stations which are holding the wireless communication with the wireless LAN base station to hold the wireless communication with the second wireless LAN module and controlling the first wireless LAN module and the second wireless LAN module to be activated, if the determination result of the determination step is NO.

In the communication control method, the first wireless LAN module may comprise a plurality of wireless communication sections based on different wireless communication systems from one another, the second wireless LAN module comprises a plurality of wireless communication sections based on different wireless communication systems from one another, and the determination step, the first control step, and the second control step are executed according to each of the wireless communication systems.

In the communication control method, the different wireless communication systems may be allocated for respective packet sizes.

In the communication control method, the different wireless communication systems may be allocated for respective packet types.

BRIEF DESCRIPTION OF THE DRAWINGS

FIG. 15 is a first format diagram for explaining wireless LAN signal extraction performed by an extraction section 182 in the third embodiment of the invention;

FIG. 16 is a second format diagram for explaining the wireless LAN signal extraction performed by the extraction section 182 in the third embodiment of the invention;

FIG. 17 is a conceptual view illustrating a manner of connection between the wireless LAN base station and the client terminal station in the fourth embodiment of the present invention; and FIG. 18 is a conceptual view illustrating a manner of connection between the wireless LAN base station and the client terminal station in the fifth embodiment of the present invention.

DESCRIPTION OF THE PREFERRED EMBODIMENTS

Embodiments of the present invention will be described hereinafter in detail with reference to the drawings.

First Embodiment

Figure 1:
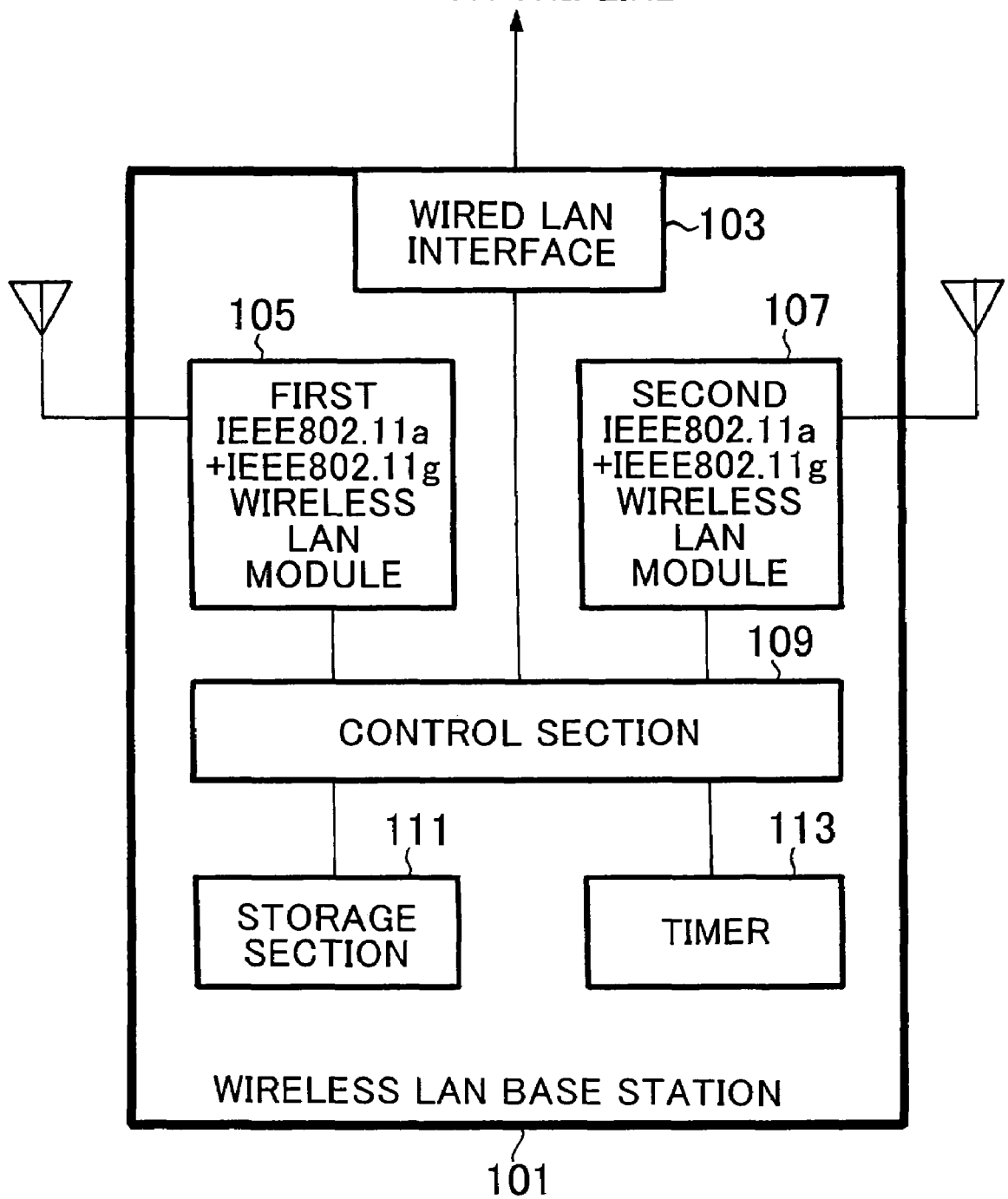
FIG. 1 is a block diagram illustrating the configuration of a wireless LAN base station in a first embodiment of the present invention.

FIG. 1 illustrates the configuration of the first embodiment of the present invention.

Referring to FIG. 1, an antenna control method executed by a wireless LAN base station having three or more antennas is shown as the first embodiment of the present invention.

In FIG. 1, the wireless LAN base station 101 includes a wired LAN interface 103, a first IEEE802.11a+IEEE802.11g wireless LAN module 105, a second IEEE802.11a+IEEE802.11g wireless LAN module 107, a control section 109, a storage section 111, and a timer 113.

The wired LAN interface 103 is an interface between the wireless LAN base station 101 and an upper LAN.

Each of the first and second IEEE802.11a+IEEE802.11g wireless LAN modules 105 and 107 is a double MAC (Media Access Control) wireless LAN module that can hold a communication according to IEEE802.11a and a communication according to IEEE802.11g simultaneously. If the two modules are combined, two channels for IEEE802.11a and two channels for IEEE802.11g, i.e., a total of four wireless channels can be simultaneously used.

The control section 109 controls entirety of the wireless LAN base station 101.

The storage section 111 is a section that temporarily stores packets which the wired LAN interface 103, the first IEEE802.11a+IEEE802.11g wireless LAN module 105, and the second IEEE802.11a+IEEE802.11g wireless LAN module 107 transmit and receive.

The timer 113 is a section which regularly generates an interrupt which will be applied to the control section 109.

When the wireless LAN base station 101 is turned on or reset, only the first IEEE802.11a+IEEE802.11g wireless LAN module 105 is activated, while the second IEEE802.11a+IEEE802.11g wireless LAN module 107 is kept inactive.

If the timer 113 regularly generates an interrupt which will be applied to the control station 109, the control station 109 checks the present number of client terminal stations. If the number exceeds a preset value, the control station 109 controls the second IEEE802.11a+IEEE802.11g wireless LAN module 107 to be activated and issues an instruction to roam some of the client terminal stations for the first IEEE802.11a+IEEE802.11g wireless LAN module 105 to the second IEEE802.11a+IEEE802.11g wireless LAN module 107.

The client terminal stations which receive this instruction are roamed to the second IEEE802.11a+IEEE802.11g wireless LAN module 107 in response to the instruction.

Thereafter, the control section 109 similarly monitors the number of client terminal stations for the first IEEE802.11a+IEEE802.11g wireless LAN module 105 and those for the second IEEE802.11a+IEEE802.11g wireless LAN module 107. If the sum of the numbers is below the preset value, the control section 109 issues an instruction to return some of the client terminal stations for the second IEEE802.11a+IEEE802.11g wireless LAN module 107 to the first IEEE802.11a+IEEE802.11g wireless LAN module 105.

The client terminal stations which receive this instruction are returned to the first IEEE802.11a+IEEE802.11g wireless LAN module 105 in response to the instruction.

After confirming that all the client terminal stations of the second IEEE802.11a+IEEE802.11g wireless LAN module 107 are returned to the first IEEE802.11a+IEEE802.11g wireless LAN module 105, the control section 109 controls the second IEEE802.11a+IEEE802.11g wireless LAN module 107 to be inactivated.

The wireless LAN base station antenna control system having three or more antennas shown in FIG. 1 will next be described.

In FIG. 1, when the wireless LAN base station 101 is activated, the control section 109 activates the first IEEE802.11a+IEEE802.11g wireless LAN module 105, while the second IEEE802.11a+IEEE802.11g wireless LAN module 107 is kept inactive.

Figure 2:
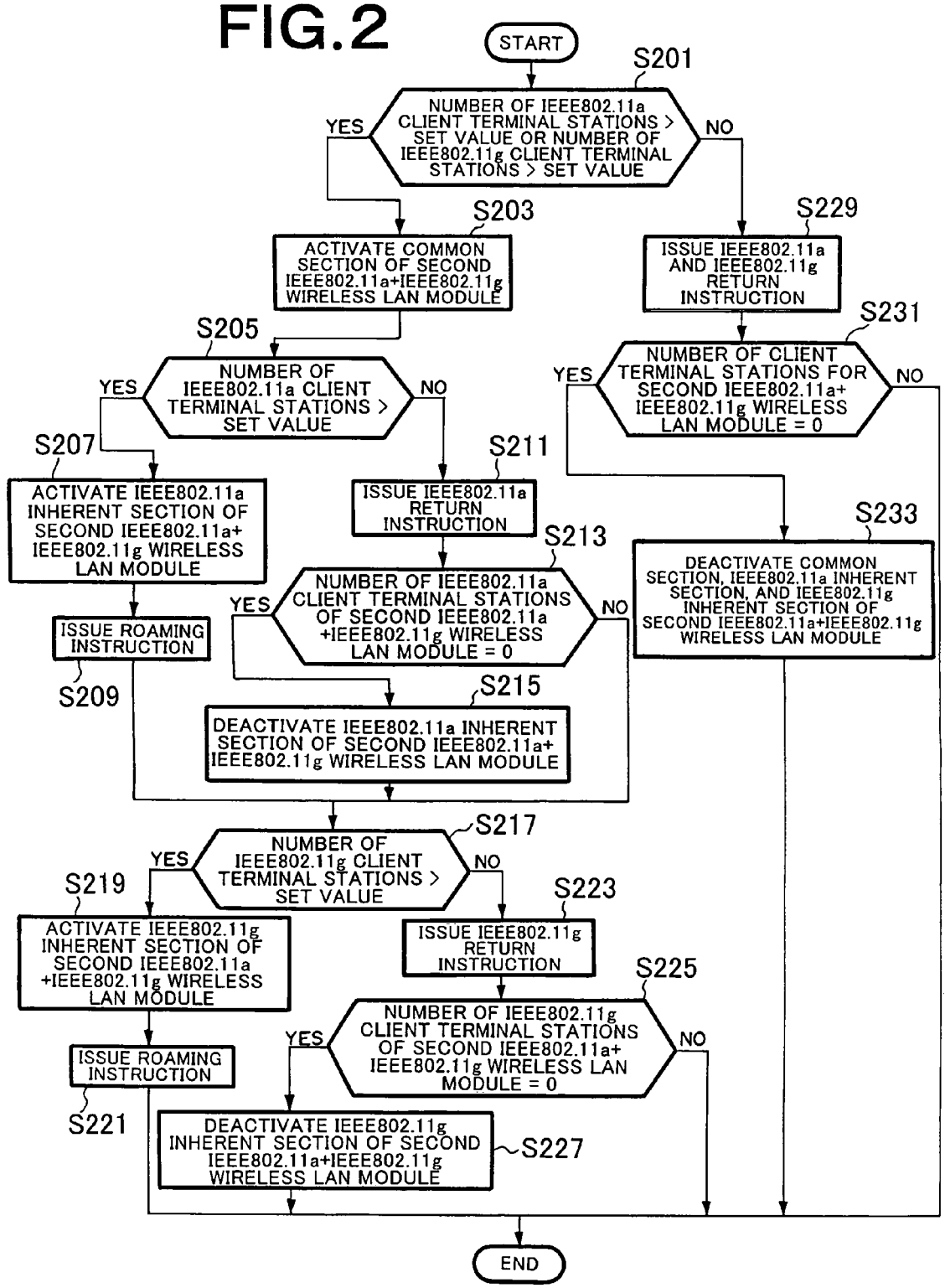
FIG. 2 is a flow chart which illustrates a number-of-antennas control method executed by a control section 109 of the wireless LAN base station in the first embodiment of the invention.

The timer 113 is a timer which regularly generates an interrupt which will be applied to the control section 109. Whenever the timer 113 generates an interrupt which will be applied to the control section 109, the control section 109 executes a method as shown in FIG. 2.

Figure 3:
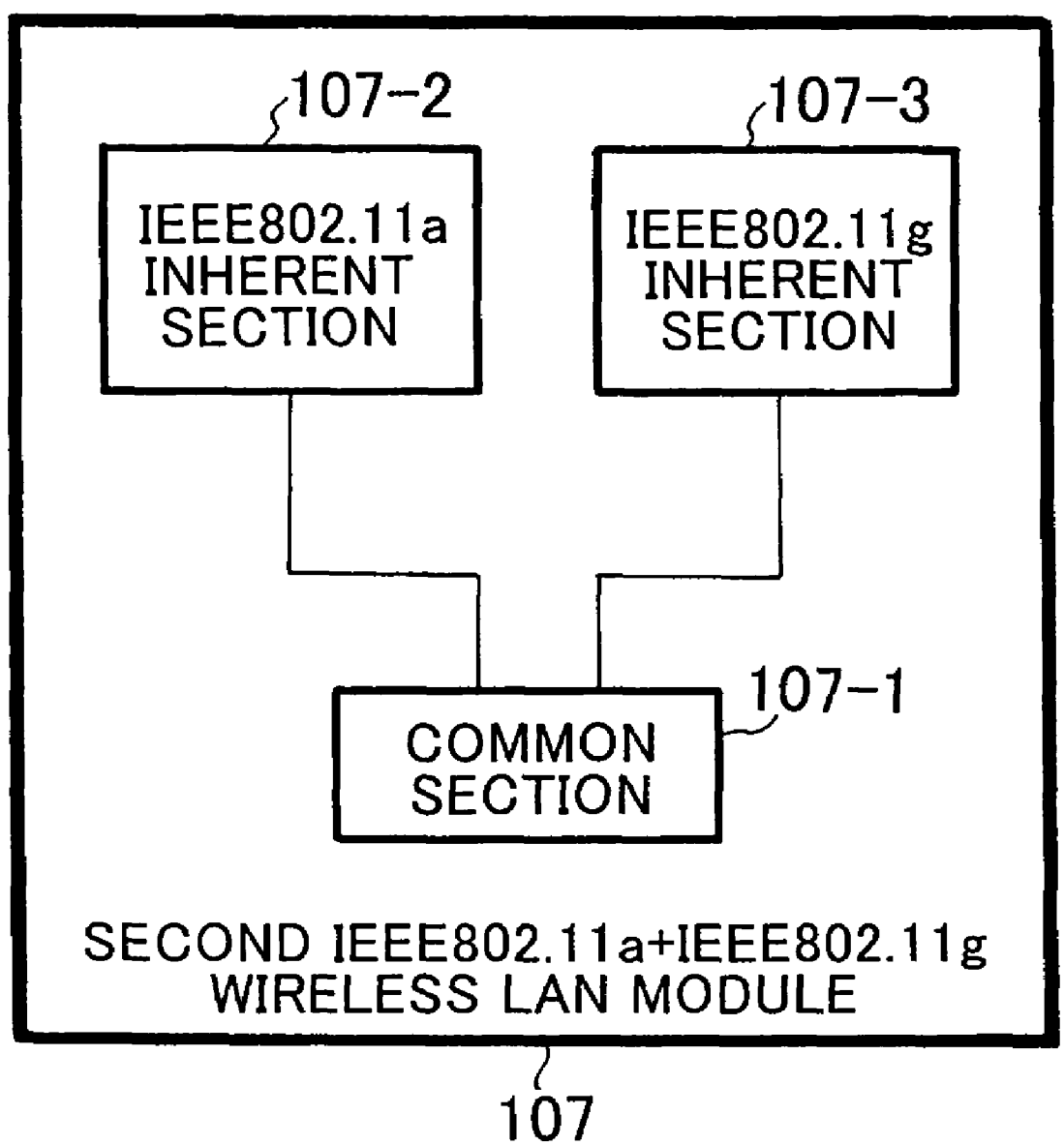
FIG. 3 is a block diagram illustrating the configuration of a second IEEE802.11a+IEEE802.11g wireless LAN module of the wireless LAN base station in the first embodiment of the invention.

According to this method, the control section 109 activates/deactivates a common section 107-1 (shown in FIG. 3), an IEEE802.11a inherent section 107-2 (shown in FIG. 3), and an IEEE802.11g inherent section (shown in FIG. 3) of the second IEEE802.11a+IEEE802.11g wireless LAN module 107.

It is noted that the common section 107-1 is a section which is not inherent in IEEE802.11a and IEEE802.11g.

The IEEE802.11a inherent section 107-2 is a section such as an RF section and an MAC section relevant only to IEEE802.11a.

The IEEE802.11g inherent section 170-3 is a section such as an RF section and an MAC section relevant only to IEEE802.11g.

The method shown in FIG. 2 will next be described.

It is first determined whether at least one of a condition that the number of IEEE802.11a client terminal stations is greater than a first set value and a condition that the number of IEEE802.11g client terminal stations is greater than a second set value (in a step S201). If the determination result of the step S201 is YES, the processing goes to a step S203. If NO, the processing goes to a step S229. It is noted that the first set value may or may not be equal to the second set value.

In the step S203, the common section 107-1 of the second IEEE802.11a+IEEE802.11g wireless LAN module 107 is activated. It is then determined whether the number of IEEE802.11a client terminal stations is greater than the first set value (in a step S205). If the determination result of the step S205 is YES, the processing goes to a step S207. If NO, the processing goes to a step S211.

In the step S207, the IEEE802.11a inherent section 107-2 of the second IEEE802.11a+IEEE802.11g wireless LAN module 107 is activated. Next, an instruction to roam some of the IEEE802.11a client terminal stations from the first IEEE802.11a+IEEE802.11g wireless LAN module 104 to the second IEEE802.11a+IEEE802.11g wireless LAN module 107 is issued (in a step S209), and the processing goes to a step S217.

In the step S211, an instruction to return from the second IEEE802.11a+IEEE802.11g wireless LAN module 107 to the first IEEE802.11a+IEEE802.11g wireless LAN module 105 is issued to the IEEE802.11a client terminal stations connected to the second IEEE802.11a+IEEE802.11g wireless LAN module 107 (in a step S211) Next, it is determined whether the number of the IEEE802.11a client terminal stations for the second IEEE802.11a+IEEE802.11g wireless LAN module 107 becomes zero (in a step S213). If the determination result of the step S213 is YES, the IEEE802.11a inherent section 107-2 of the second IEEE802.11a+IEEE802.11g wireless LAN module 107 is deactivated (in a step S215), and the processing goes to a step S217. If the determination result of the step S213 is NO, the processing directly goes to the step S217.

In the S217, it is determined whether the number of the IEEE802.11g client terminal stations is greater than the second set value. If the determination result of the step S217 is YES, the processing goes to a step S219. If NO, the processing goes to a step S223.

In the step S219, the IEEE802.11g inherent section 107-3 of the second IEEE802.11a+IEEE802.11g wireless LAN module 107 is activated. Next, an instruction to roam from the first IEEE802.11a+IEEE802.11g wireless LAN module 105 to the second IEEE802.11a+IEEE802.11g wireless LAN module 107 is issued to some of the IEEE802.11g client terminal stations (in a step S221), and the processing is finished.

In the step S223, an instruction to return from the second IEEE802.11a+IEEE802.11g wireless LAN module 107 to the first IEEE802.11a+IEEE802.11g wireless LAN module 105 is issued to the IEEE802.11g client terminal stations connected to the second IEEE802.11a+IEEE802.11g wireless LAN module 107. Next, it is determined whether the number of the IEEE802.11g client terminal stations of the second IEEE802.11a+IEEE802.11g wireless LAN module 107 becomes zero (in a step S225). If the determination result of the step S225 is YES, the IEEE802.11g inherent section 107-3 of the second IEEE802.11a+IEEE802.11g wireless LAN module 107 is deactivated (in a step S227), and the processing is finished. If the determination result of the step S225 is NO, the processing is finished without deactivating the IEEE802.11g inherent section 107-3.

In the step S229, an instruction to return from the second IEEE802.11a+IEEE802.11g wireless LAN module 107 to the first IEEE802.11a+IEEE802.11g wireless LAN module 105 is issued to the IEEE802.11a client terminal stations and the IEEE802.11g client terminal stations connected to the second IEEE802.11a+IEEE802.11g wireless LAN module 107 (in a step S229). Next, it is determined whether the number of the IEEE802.11a client terminal stations and the IEEE802.11g client terminal stations connected to the second IEEE802.11a+IEEE802.11g wireless LAN module 107 becomes zero (in a step S231). If the determination result of the step S231 is YES, the IEEE802.11a inherent section 107-2 and the IEEE802.11g inherent section 107-3 of the second IEEE802.11a+IEEE802.11g wireless LAN module 107 are deactivated (in a step S233), and the processing is finished.

As can be seen, according to the present invention, the channels are activated or deactivated based on the number of client terminal stations that hold communication with the wireless LAN base station 101. Therefore, it is possible to realize both high throughput and low power consumption by fully using the four antennas when communication demand is high and by decreasing the number of the antennas when the communication demand is low.

Second Embodiment

Figure 4:
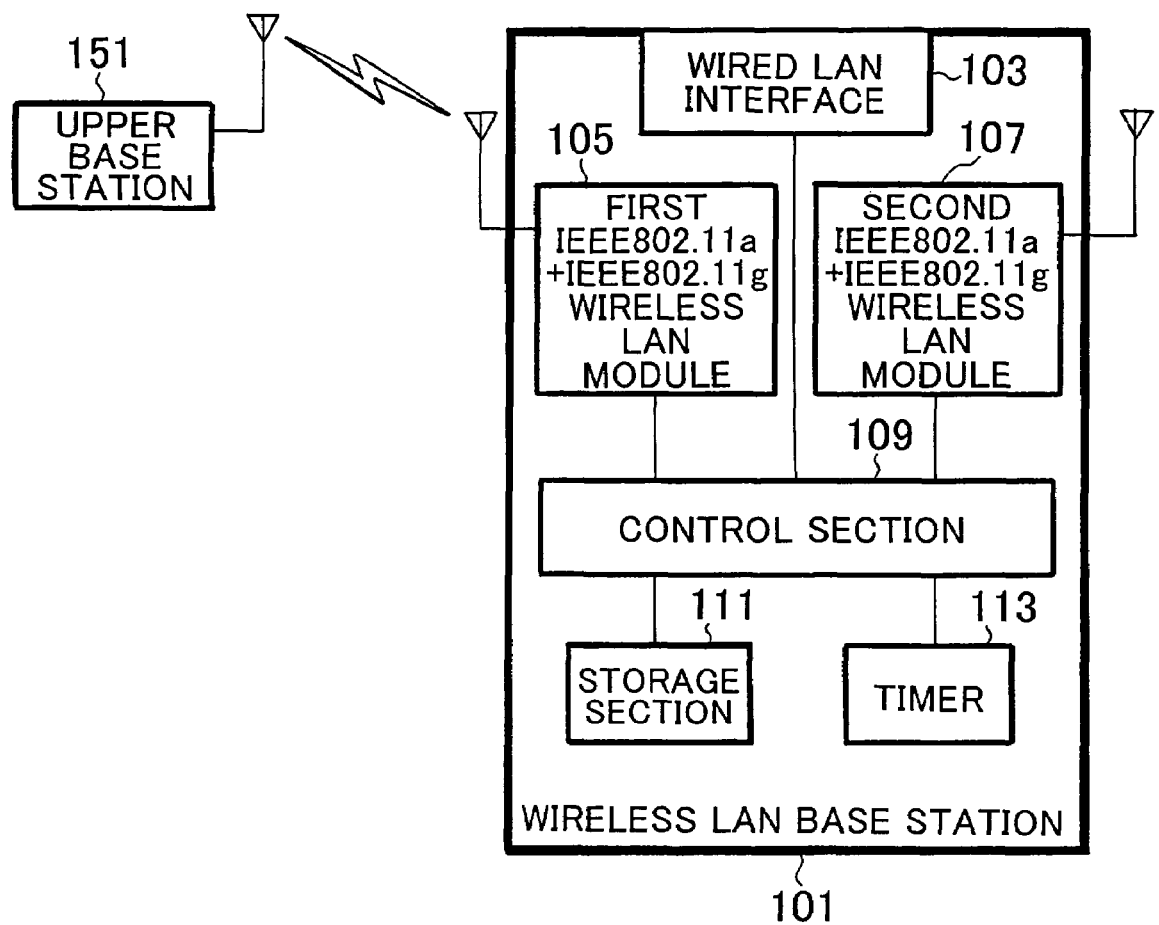
FIG. 4 is a conceptual view illustrating a manner of connection between the wireless LAN base station and an upper base station in a second embodiment of the present invention.

FIG. 4 illustrates the configuration of the second embodiment of the present invention.

In the second embodiment, not the wired LAN interface 103 but one of the four antennas is used to hold communication with an upper base station 151.

The communication with the upper base station 151 is established in either an ad hoc mode or an infrastructure mode. In the infrastructure mode, only the relevant antenna operates as a terminal station, whereas the other three antennas operate as base stations.

As a result, the number of antennas allocated to the client terminal stations decreases by one as compared with the first embodiment. Nevertheless, the second embodiment is free from a physical restriction of providing a wired LAN.

Third Embodiment

In order to introduce the second embodiment, it is necessary to perform encapsulation of an MAC address and to transship data between packets. The second embodiment provides a system to do so.

Figure 5:
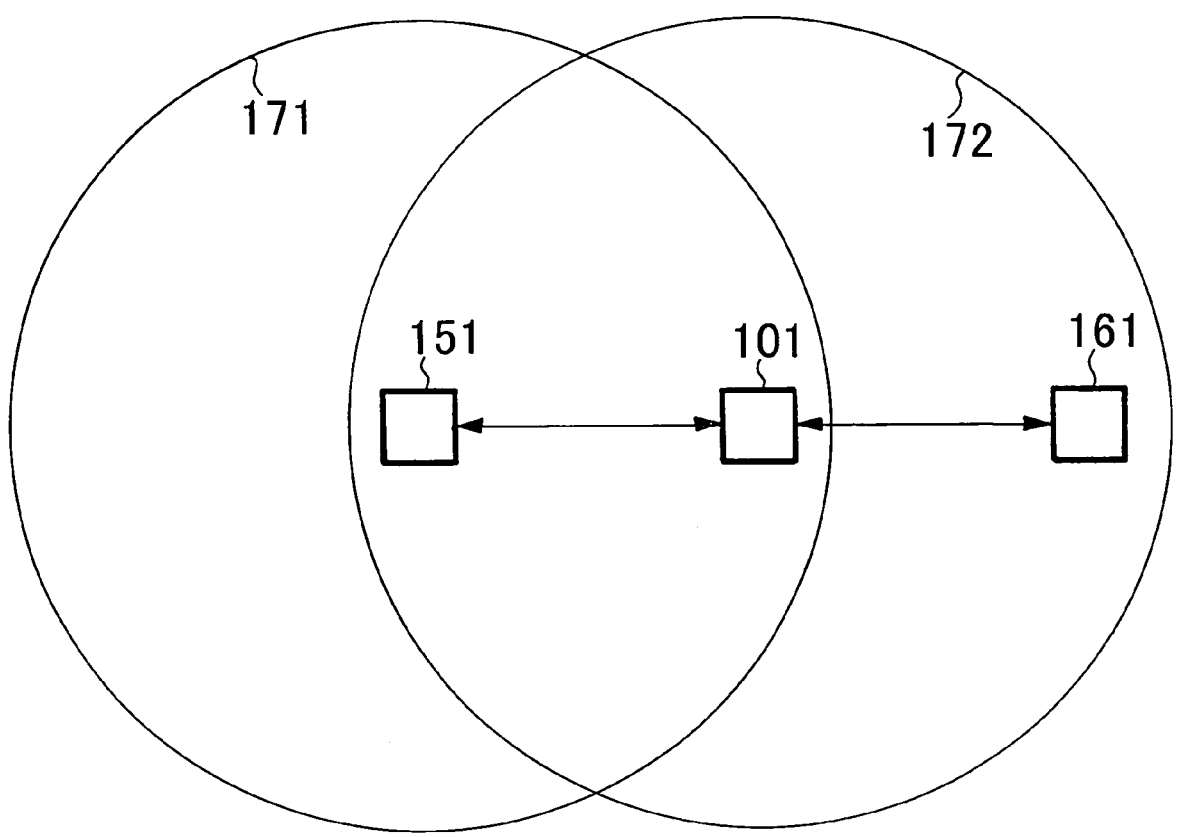
FIG. 5 is a conceptual view illustrating the configuration of a wireless LAN system in a third embodiment of the present invention.

FIG. 5 is a conceptual view illustrating the configuration of a wireless LAN system in the third embodiment of the present invention.

Referring to FIG. 5, the wireless LAN system in the third embodiment includes the upper base station 151, the wireless LAN base station 101, and a client terminal 161. The upper base station 151 can communicate with a plurality of wireless LAN terminals in a wireless LAN area 171. Therefore, the upper base station 151 can also communicate with the wireless LAN base station 101. The wireless LAN base station 101 also functions as a wireless LAN base station and can communicate with a plurality of wireless LAN terminals in a wireless LAN area 172. Therefore, the wireless LAN base station 101 can also communicate with the client terminal station 161. It is noted that wireless channels in the wireless LAN area 171 differ from those in the wireless LAN area 172 so as to avoid collision between the wireless channels.

Figure 6:
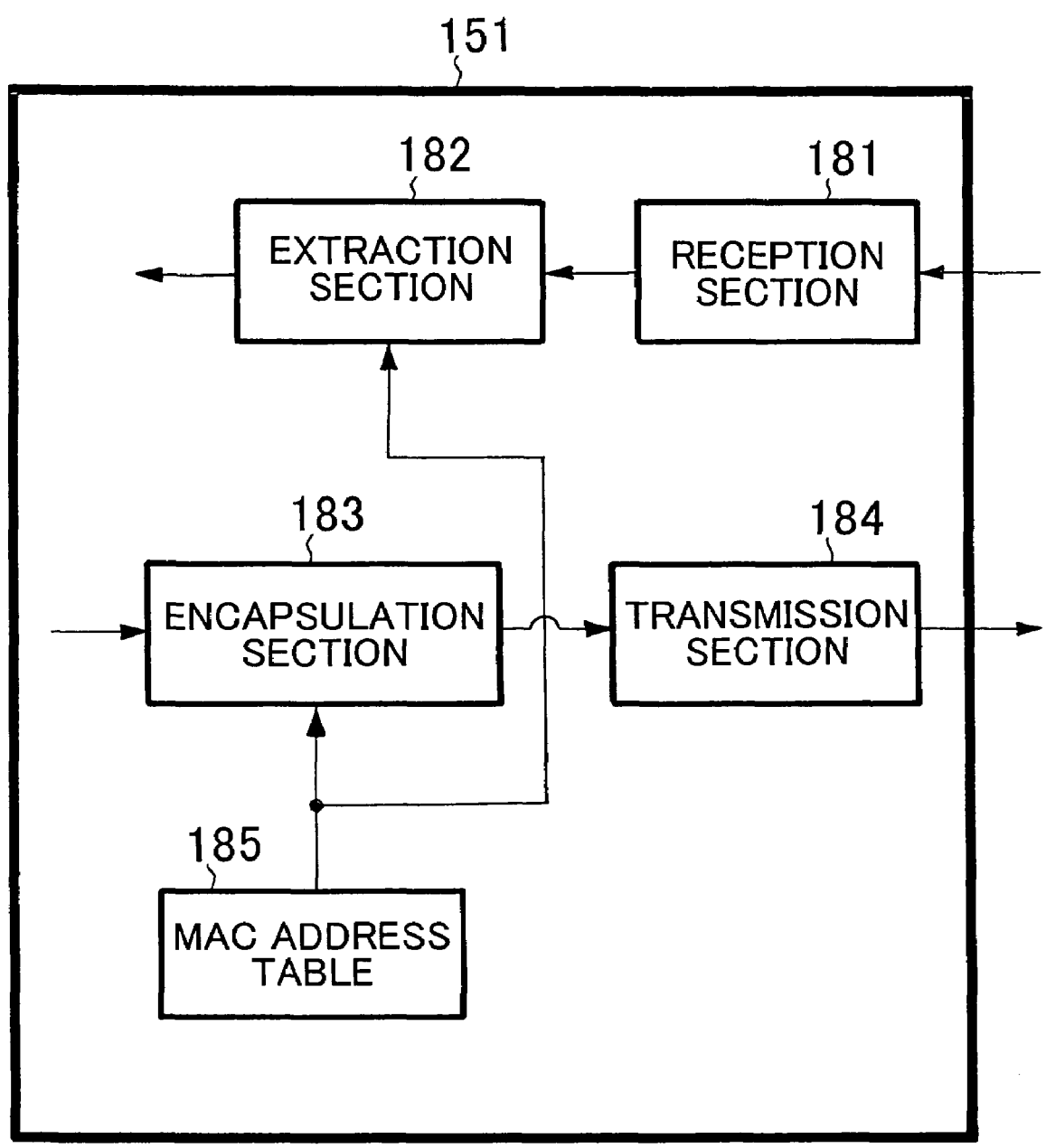
FIG. 6 is a block diagram illustrating the configuration of an upper base station 151 in the third embodiment of the invention.
Figure 7:
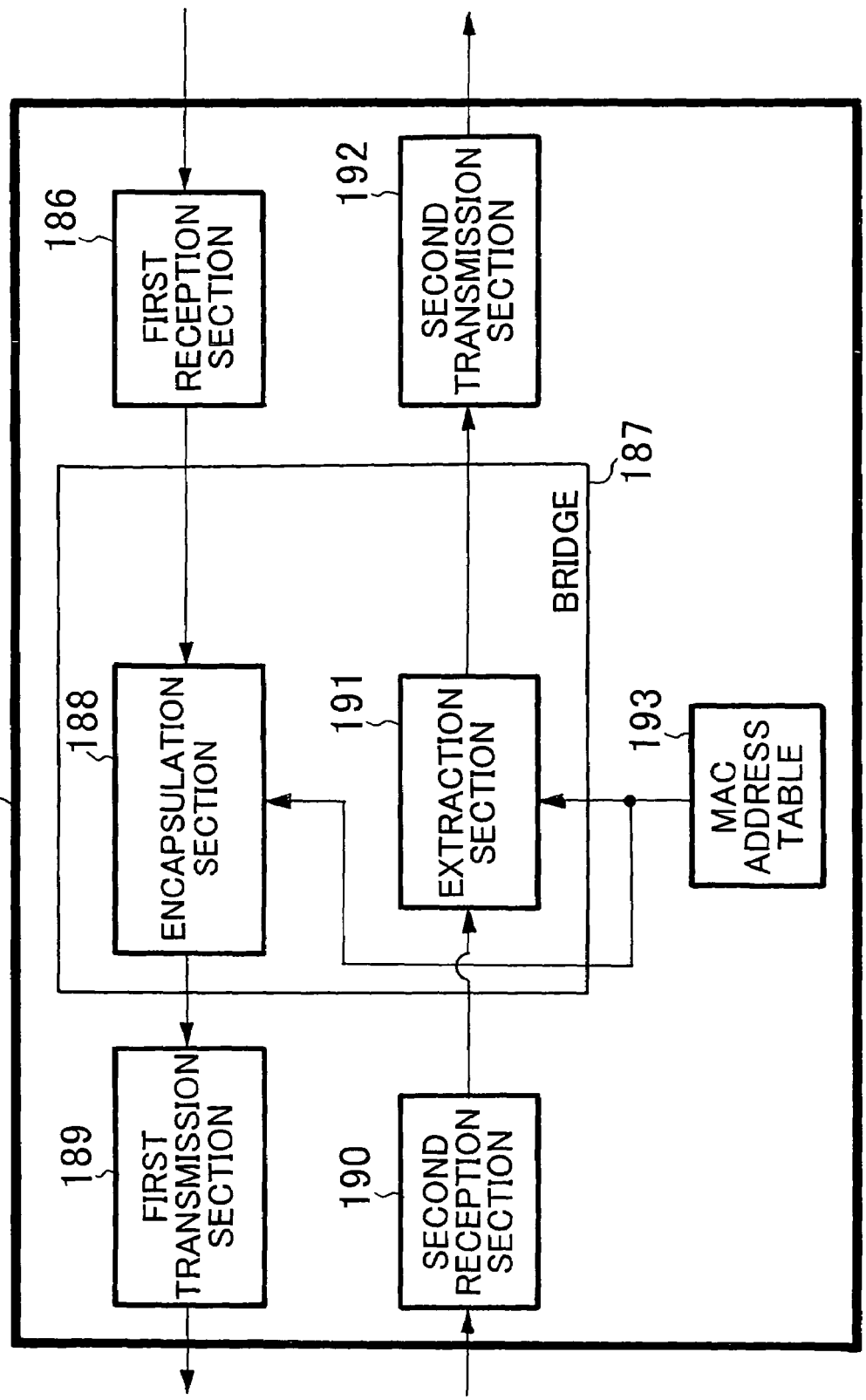
FIG. 7 is a block diagram illustrating the configuration of a wireless LAN base station 101 in the third embodiment of the invention.
Figure 8:
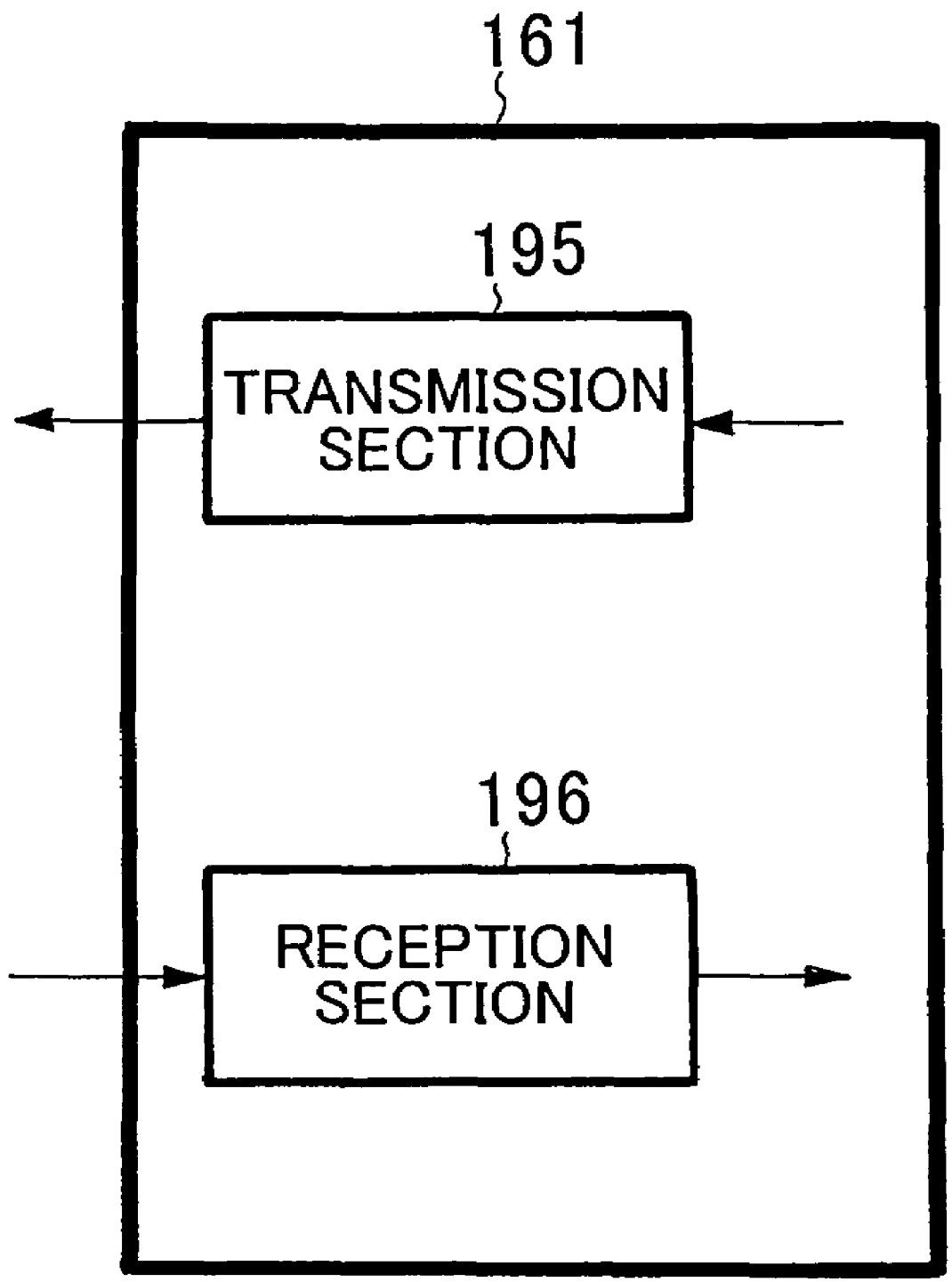
FIG. 8 is a block diagram illustrating the configuration of a client terminal station 161 in the third embodiment of the invention.

Referring next to FIGS. 6 to 8, configurations of the upper base station 151, the wireless LAN base station 101, and the client terminal station 161 will be described, respectively. While FIGS. 6 to 8 only illustrate constituent elements relevant to the present invention, the upper base station 151 has also a function of the conventional wireless LAN base station, not shown, and each of the wireless LAN base station 101 and the client terminal station 161 has also a function of the conventional wireless LAN base station.

FIG. 6 is a block diagram illustrating the configuration of the upper base station 151. Referring to FIG. 6, the upper base station 151 includes a reception section 181, an extraction section 182, an encapsulation section 183, a transmission section 184, and an MAC address table 185. The reception section 181 receives a wireless LAN signal from the wireless LAN base station 101. The extraction section 182 extracts a wireless LAN signal from the client terminal station 161 which signal is encapsulated into the received wireless LAN signal received from the wireless LAN base station 101. The encapsulation section 183 encapsulates the wireless LAN signal to be transmitted to the client terminal station 161 into the wireless LAN signal to be transmitted to the wireless LAN base station 101. The transmission section 184 transmits the wireless LAN signal, into which the wireless LAN signal to be transmitted to the client terminal station 161 is encapsulated, to the wireless LAN base station 101. The MAC address table 185 has a configuration as shown in Table 1 below.

TABLE 1

| First Row | Second Row |
|---|---|
| MAC address of wireless LAN base station 101 | Null value |
| MAC addresses of wireless LAN terminals directly connected to upper base station 151 | Null value |
| MAC address of client terminal station 161 | MAC address of wireless LAN base station 101 |
| MAC addresses of other wireless LAN terminals indirectly connected to upper base station 151 | MAC address of interposing wireless LAN base station |

For the wireless LAN terminals directly connected to the upper base station 151, a pair of the MAC address of each of the wireless LAN terminals and a null value (e.g., "0") are stored in the MAC address table 185. For the wireless LAN terminals indirectly connected to the upper base station 151, a pair of the MAC address of each of the wireless LAN terminal stations and the MAC address of the wireless LAN base station that interposes between the wireless LAN terminals and the upper base station 151 are stored in the MAC address table 185. Therefore, for the wireless LAN base station 101 directly connected to the upper base station 151, a pair of the MAC address of the wireless LAN base station 101 and the null value are stored in the MAC address table 185. In addition, for the client terminal station 161 connected to the upper base station 151 through the wireless LAN base station 101, a pair of the MAC address of the client terminal station 161 and the MAC address of the wireless LAN base station 101 are stored in the MAC address table 185.

The extraction section 182 determines whether a special header (a header other than a conventional, standard header such as a header of an IP (Internet Protocol) packet, a header of an ICMP (Internet Control Message Protocol) packet and a header of an ARP (Address Resolution Protocol) header) is inserted into a top of a payload of a second OSI (Open Systems Interconnection) layer. The extraction section 182 can thereby know whether the wireless LAN signal from the client terminal station 161 which signal is encapsulated into the wireless LAN signal received by the reception section 181 is present. If the determination result as to whether the special header is inserted thereinto is YES, the extraction section 182 determines that the wireless LAN signal from the client terminal station 161 which signal is encapsulated into the wireless LAN signal received by the reception section 181 is present and extracts the encapsulated wireless signal. If the determination result is NO, the extraction section 182 outputs the wireless LAN signal received by the reception section 181 as it is.

Further, the encapsulation section 183 searches a record, in which the destination MAC address in the header of the wireless LAN signal to be transmitted from the transmission section 184 is the MAC address in the first row, from the MAC address table 185, and determines whether the value in the second row of the record is a null value. The encapsulation section 183 can thereby know whether to encapsulate the wireless LAN signal to be transmitted from the transmission section 814. If the determination result as to whether the value is a null value is NO, the encapsulation section 183 determines that the wireless LAN signal to be transmitted from the transmission section 184 should be encapsulated and encapsulates the wireless LAN signal. If the determination result is YES, the encapsulation section 183 outputs the wireless LAN signal to be transmitted from the transmission section 184 without encapsulation.

The client terminal station 161 transmits its MAC address to the wireless LAN base station 101 when transmitting an adscription request to wireless LAN base station functional sections of the wireless LAN base station 101. If so, the wireless LAN base station 101 stores the MAC address of the client terminal station 161 in the MAC address table 193 and transfers a pair of the MAC address of the client terminal station 161 and the MAC address of the wireless LAN base station 101 to the upper base station 151. The upper base station 151 stores a record, in which the MAC address of the client terminal station 161 is in the first row and the MAC address of the wireless LAN base station 101 is in the second row, in the MAC address table 185.

FIG. 7 is a block diagram illustrating the configuration of the wireless LAN base station 101. Referring to FIG. 7, the wireless LAN base station 101 includes a first reception section 186, an encapsulation section 188, a first transmission section 189, a second reception section 190, an extraction section 191, a second transmission section 192, and an MAC address table 193. The MAC address table 193 has a configuration as shown in Table 2 below and stores MAC addresses of all the wireless LAN terminals wirelessly connected to the wireless LAN base station functional sections of the wireless LAN base station 101.

TABLE 2

MAC address of client terminal station 161
MAC addresses of the other wireless LAN terminals connected to wireless LAN base station 101

The encapsulation section 188 and the extraction section 191 are included in a bridge 187. The first reception section 186 receives a wireless LAN signal from the client terminal station 161. The encapsulation section 188 encapsulates the wireless LAN signal received from the client terminal station 161 and generates a new wireless LAN signal. The first transmission section 189 transmits the wireless LAN signal generated by the encapsulation section 188 to the upper base station 151. The second reception section 190 receives a wireless LAN signal from the upper base station 151. The extraction section 191 determines whether a special header is inserted into the top of the payload of the second OSI layer of the wireless LAN signal received by the second reception section 190, whereby the extraction section 191 can know whether a wireless LAN signal is encapsulated in the wireless LAN signal received by the second reception section 190. If the determination result as to whether the special header is inserted is YES, the extraction section 191 determines that the wireless LAN signal addressed to the client terminal station 161 and encapsulated into the wireless LAN signal received by the second reception section 190 is present and extracts the encapsulated wireless LAN signal.

The second transmission section 192 transmits the wireless LAN signal, which is extracted by the extraction section 191 and addressed to the client terminal station 161, to the client terminal station 161. The MAC address table 193 holds MAC addresses of the wireless LAN terminals, such as the client terminal station 161, connected to the upper base station 151 through the wireless LAN base station 101.

The client terminal station 161 transmits its MAC address to the wireless LAN base station 101 when transmitting the adscription request to the wireless LAN base station functional sections (including the first reception section 186 and the second transmission section 192) of the wireless LAN base station 101.

FIG. 8 is a block diagram illustrating the configuration of the client terminal station 161. The client terminal station 161 includes a transmission section 195 and a reception section 196. The transmission section 195 transmits a wireless LAN signal to the wireless LAN base station 101. The reception section 196 receives a wireless LAN signal from the wireless LAN base station 101. The transmission section 195 and the reception section 196 are connected to an upper layer (not shown).

Figure 9:
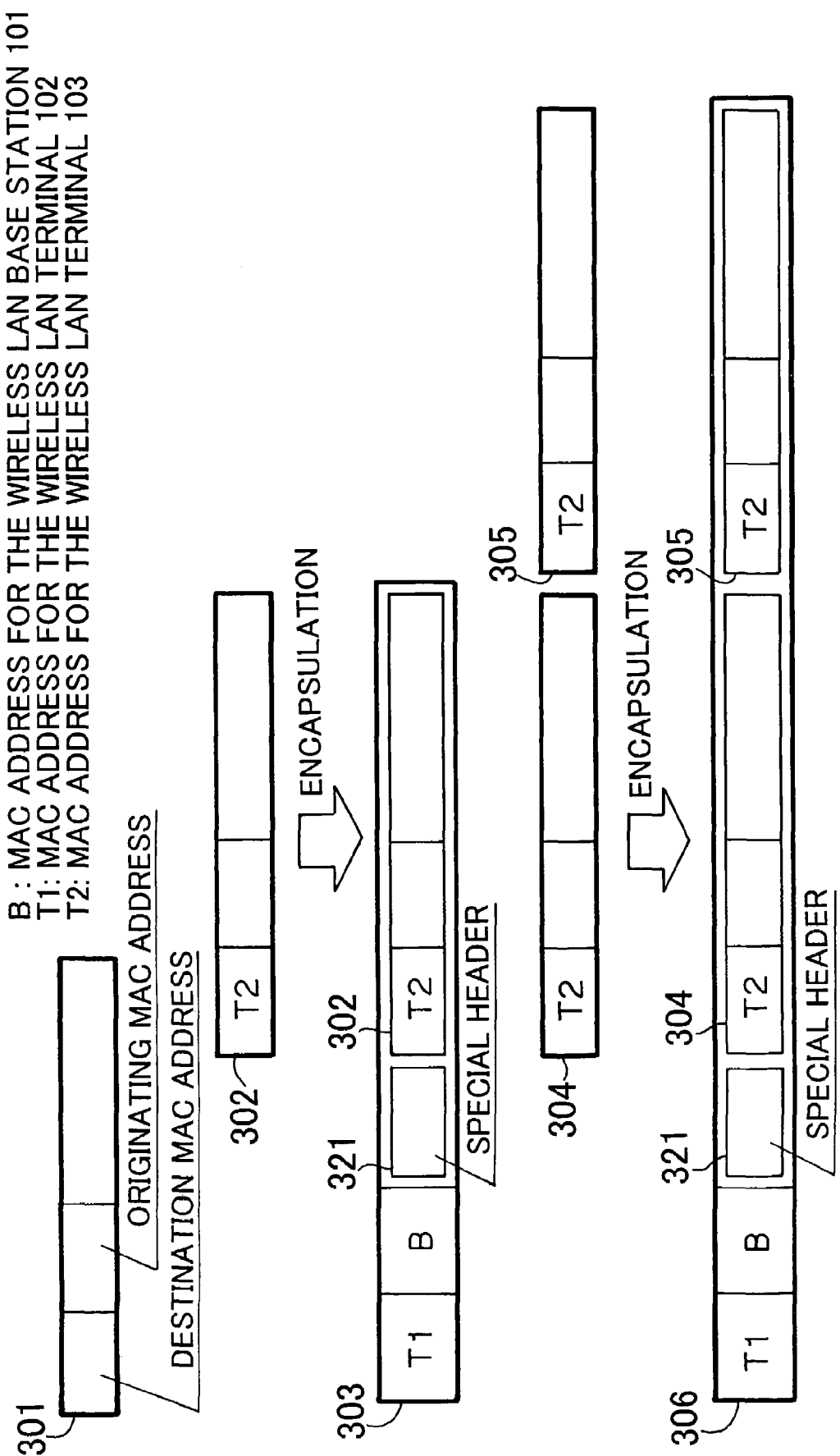
FIG. 9 is a first format diagram for explaining encapsulation performed by an encapsulation section 183 in the third embodiment of the invention.
Figure 10:
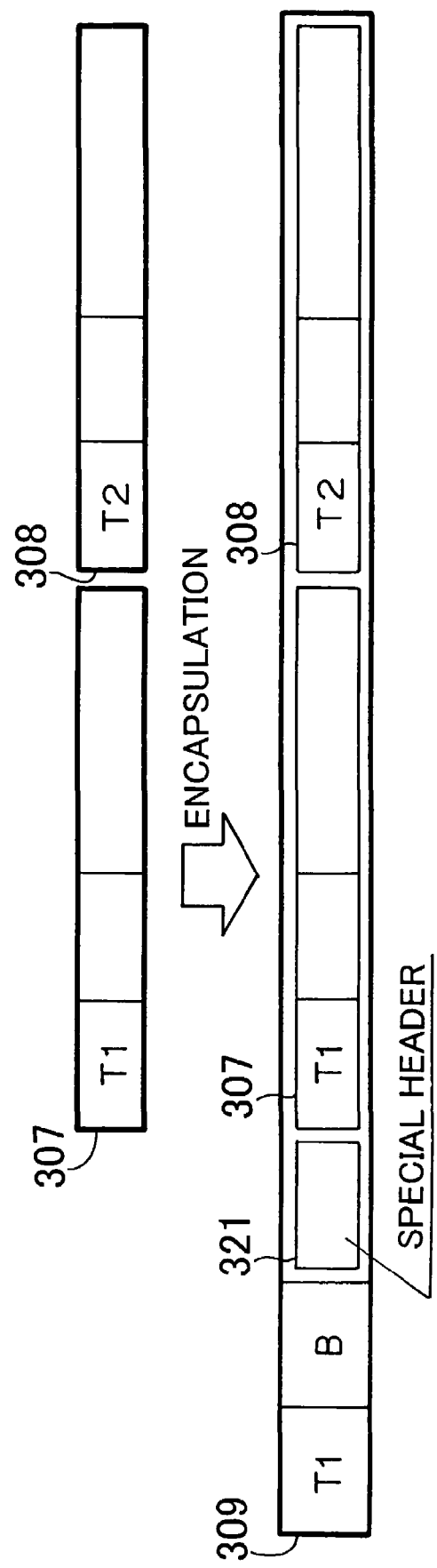
FIG. 10 is a second format diagram for explaining the encapsulation performed by the encapsulation section 183 in the third embodiment of the invention.

Referring next to FIGS. 9 and 10, encapsulation performed by the encapsulation section 183 of the upper base station 151 will be described. As shown in FIG. 9, normally, a destination MAC address and a sender MAC address are described in the header of a wireless LAN signal 301. If inputting a wireless LAN signal 302 in which the destination MAC address is the MAC address of the client terminal 161, the encapsulation section 183 adds the MAC address of the wireless LAN base station 101 as the destination MAC address MAC and the MAC address of the upper base station 151 as the sender MAC address to the input wireless LAN signal 302 and further adds thereto a special header 321, thereby generating a wireless LAN signal 303 into which the wireless LAN signal 302 is encapsulated. The encapsulation section 183 may add the MAC address of the wireless LAN base station 101 as the destination MAC address and the MAC address of the upper base station 151 as the sender MAC address to a plurality of wireless LAN signals 304 and 305 addressed to the client terminal station 161 and may further add thereto the special header 321, thereby generating a wireless LAN signal 306 into which the wireless LAN signals 304 and 305 are encapsulated. Further, the encapsulation section 183 may add the MAC address of the wireless LAN base station 101 as the destination MAC address and the MAC address of the upper base station 151 as the sender MAC address to a pair of a wireless LAN signal 307 addressed to the wireless LAN base station 101 and a wireless LAN signal 308 addressed to the client terminal station 161 and may further add thereto the special header 321, thereby generating a wireless LAN signal 309 into which the wireless LAN signals 307 and 308 are encapsulated.

Figure 11:
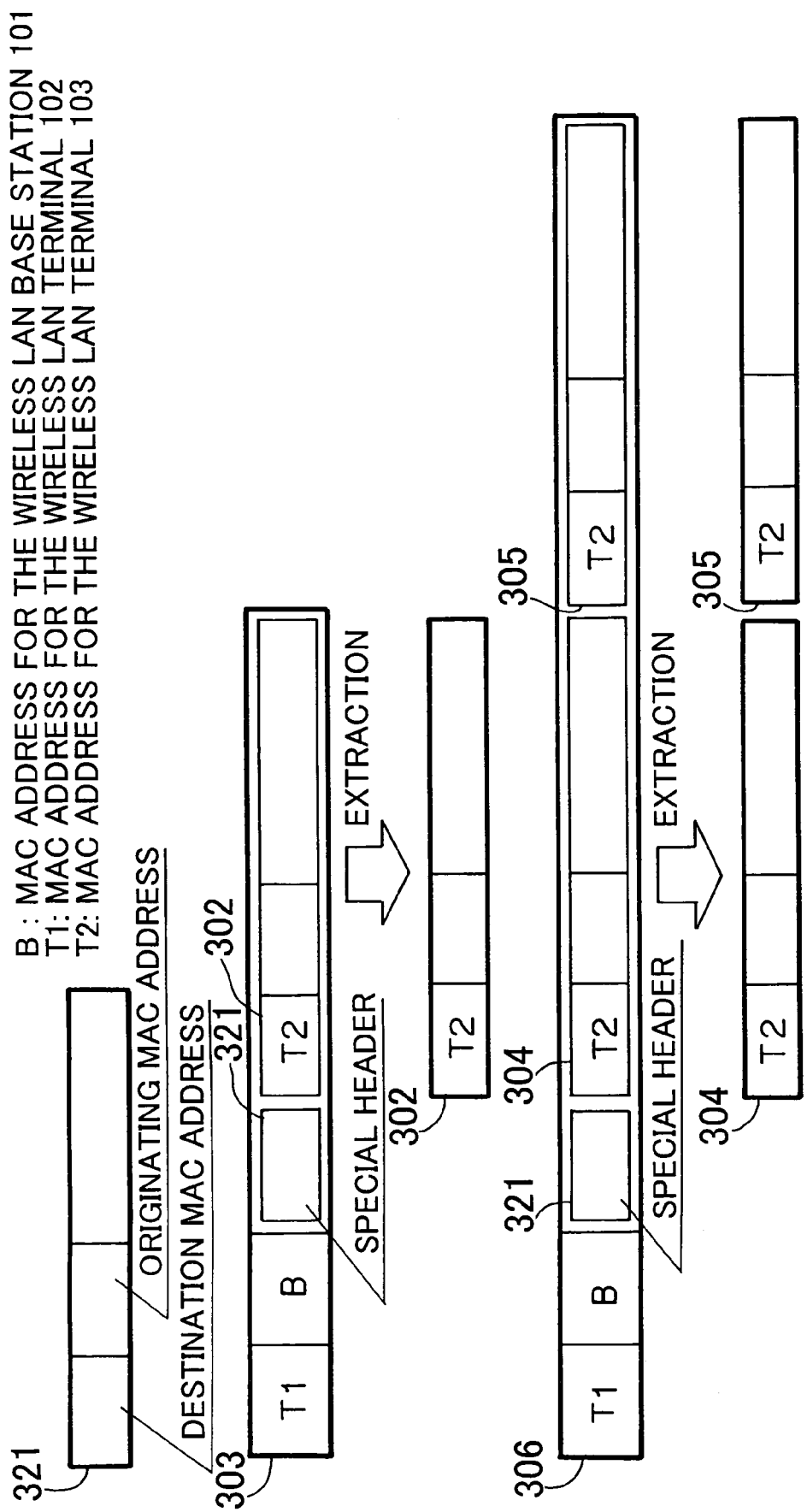
FIG. 11 is a first format diagram for explaining wireless LAN signal extraction performed by an extraction section 191 in the third embodiment of the invention.
Figure 12:
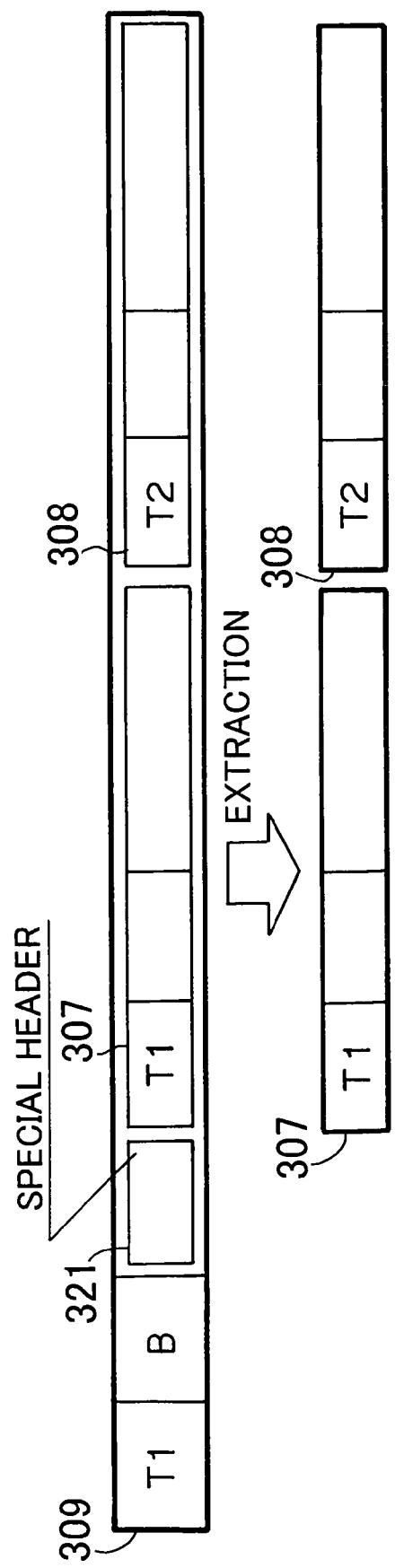
FIG. 12 is a second format diagram for explaining the wireless LAN signal extraction performed by the extraction section 191 in the third embodiment of the invention.

Referring next to FIGS. 11 and 12, wireless LAN signal extraction performed by the extraction section 191 of the wireless LAN base station 101 will be described. When the wireless LAN signal 303, into which the wireless LAN signal 302 addressed to the client terminal station 161 is encapsulated, is input to the wireless LAN base station 101, the extraction section 191 extracts the wireless LAN signal 302 from the wireless LAN signal 302. When the wireless LAN signal 306, into which the wireless LAN signals 304 and 305 addressed to the client terminal station 161 are encapsulated, is input to the wireless LAN base station 101, the extraction section 191 extracts the wireless LAN signals 304 and 305 from the wireless LAN signal 306. Further, when the wireless LAN signal 309, into which the wireless LAN signals (the wireless LAN signal 307 addressed to the wireless LAN base station 101 and the wireless LAN signal 308 addressed to the client terminal station 309) are encapsulated, is input to the wireless LAN base station 101, the extraction section 191 extracts the wireless LAN signals 307 and 308 from the wireless LAN signal 309.

Figure 13:
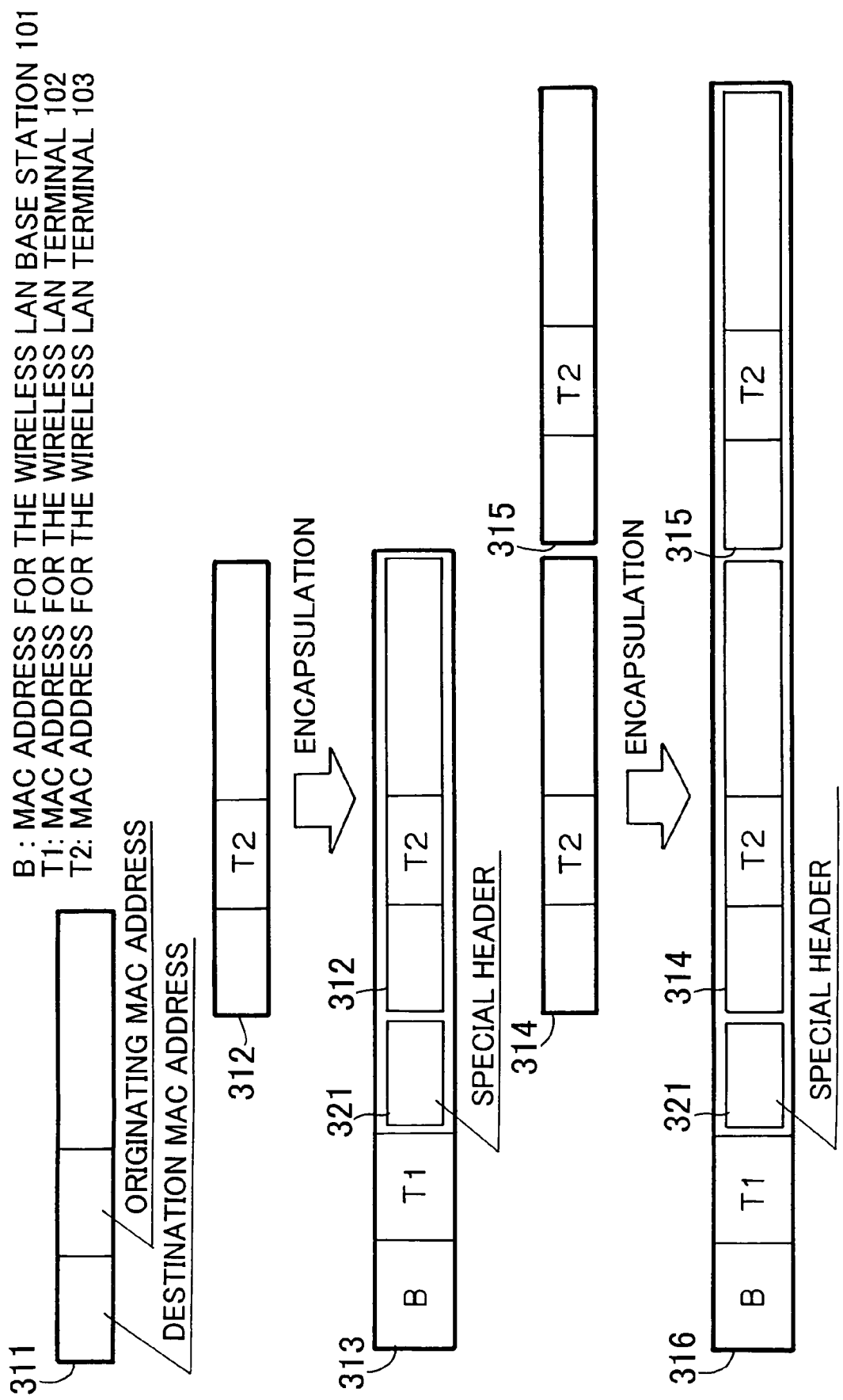
FIG. 13 is a first format diagram for explaining encapsulation performed by an encapsulation section 188 in the third embodiment of the invention.
Figure 14:
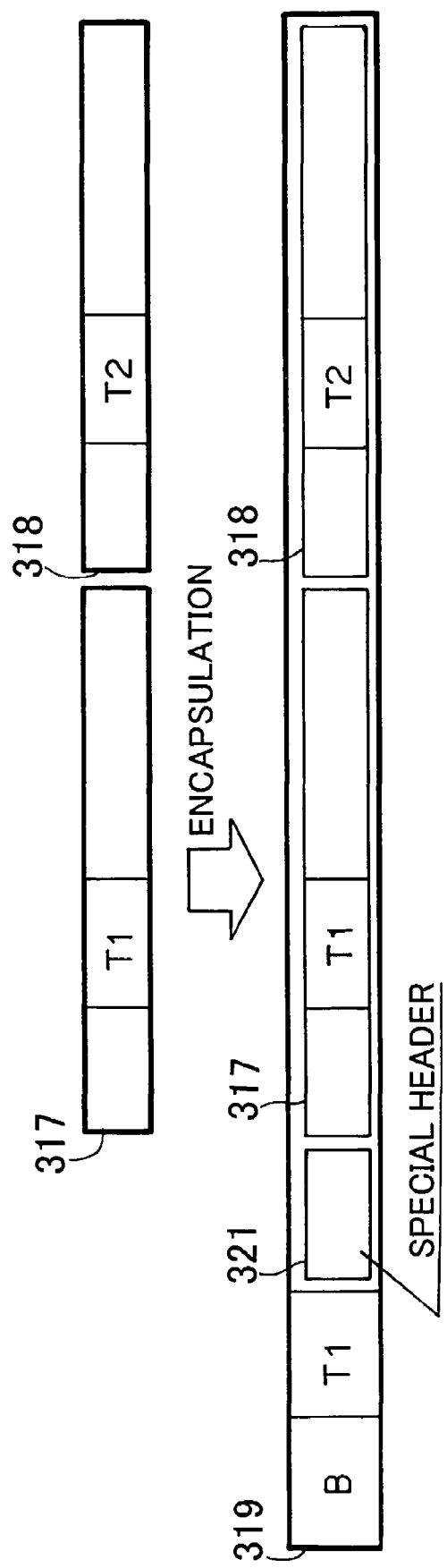
FIG. 14 is a second format diagram for explaining the encapsulation performed by the encapsulation section 188 in the third embodiment of the invention.

Referring next to FIGS. 13 and 14, encapsulation performed by the encapsulation section 188 of the wireless LAN base station 101 will be described. When the wireless LAN signal 312, which indicates that a sender is the client terminal station 161, is input to the wireless LAN base station 101, the encapsulation section 188 adds the MAC address of the upper base station 151 as the destination MAC address and the MAC address of the wireless LAN base station 101 as the sender MAC address to the input wireless LAN signal 312 and further adds thereto the special header 321, thereby generating a wireless LAN signal 313 into which the wireless LAN signal 312 is encapsulated. The encapsulation section 188 may add the MAC address of the upper base station 151 as the destination MAC address and the MAC address of the wireless LAN base station 101 as the sender MAC address to the wireless LAN signals 314 and 315, each of which indicates that the sender is the client terminal station 161, and may further add thereto the special header 321, thereby generating a wireless LAN signal 316 into which the wireless LAN signals 314 and 315 are encapsulated. Further, the encapsulation section 188 may add the MAC address of the upper base station 151 as the destination MAC address and the MAC address of the wireless LAN base station 101 as the sender MAC address to a pair of the wireless LAN signal 317 which indicates that the sender is the wireless LAN base station 101 and the wireless LAN signal 318 which indicates that the sender is the client terminal station 161 and may further add thereto the special header 321, thereby generating a wireless LAN signal 309 into which the wireless LAN signals 317 and 318 are encapsulated.

Referring next to FIGS. 15 and 16, wireless LAN signal extraction performed by the extraction section 182 of the upper base station 151 will be described. When the wireless LAN signal 313, into which the wireless LAN signal 312 indicating that the sender is the client terminal station 161 is encapsulated, is input to the upper base station 151, the extraction section 182 extracts the wireless LAN signal 312 from the wireless LAN signal 313. When the wireless LAN signal 316, into which the wireless LAN signals 314 and 315 each indicating that the sender is the client terminal station 161 are encapsulated, is input to the upper base station 151, the extraction section 182 extracts the wireless LAN signals 314 and 315 from the wireless LAN signal 316. Further, when the wireless LAN signal 319, into which the wireless LAN signals (the wireless LAN signal 317 indicating that the sender is the wireless LAN base station 101 and the wireless LAN signal 318 indicating that the sender is the client terminal station 161) are encapsulated, is input to the upper base station 151, the extraction section 182 extracts the wireless LAN signals 317 and 318 from the wireless LAN signal 319.

Fourth Embodiment

FIG. 17 illustrates the configuration of the fourth embodiment of the present invention.

In the fourth embodiment, the client terminal station 161 which holds communication with the wireless LAN base station 101 includes an IEEE802.11a+IEEE802.11g wireless LAN module 163 similarly to the wireless LAN base station 101. Communication between the base station and the terminal station is established using both of the IEEE802.11a standard and the IEEE802.11g standard.

Based on which standard the communication is to be held, IEEE802.11a or IEEE802.11g, is set between the wireless LAN base station 101 and the client terminal station 161 in advance according to a packet size. For example, if the packet size is equal to or smaller than a set value, communication is set to be held according to the IEEE802.11a standard. If the packet size exceeds the set value, communication is set to be held according to the IEEE802.11g standard.

Each of the wireless LAN base station 101 and the client terminal station 161 employs different antennas according to the packet size of a packet to be transmitted.

It is thereby possible to segregate a short packet and a long packet from each other and improve the communication efficiency of the wireless LAN system.

Fifth Embodiment

FIG. 18 illustrates the configuration of the fifth embodiment of the present invention.

The fifth embodiment is basically equal to the fourth embodiment except that communication path switching is performed based on not the packet size but a packet type.

If each of the wireless LAN base station 101 and the client terminal station 161 makes a setting such that RTP (Real-Time Transport Protocol) packets are communicated therebetween according to the IEEE802.11a standard and the other packets are communicated therebetween according to the IEEE802.11g standard, the wireless LAN base station 101 and the client terminal station 161 can transmit and receive real-time data such as voices and roaming pictures transmitted by RTP's without damaging the data.

In the embodiments described above, the IEEE802.11a+IEEE802.11g wireless LAN modules are employed. However, non-composite modules (e.g., two IEEE802.11a modules) can be similarly employed.

In addition, the IEEE802.11a standard and the IEEE802.11g standard are used for facilitating understanding. However, standard types are irrelevant to the present invention.

As described so far, the present invention can exhibit the following advantages.

The first advantage is as follows. Channel activation and deactivation are performed based on the number of client terminal stations. Therefore, it is possible to realize both high throughput and low power consumption by fully using the four antennas when communication demand is high and by decreasing the number of antennas when the communication demand is low.

The second advantage is that even if one of the modules is physically out of order, communication can be continuously held using the other module.

The third advantage is that one of the modules can be exchanged without turning off the power of the base station.

What is claimed is:

1. A wireless LAN base station which holds wireless communication with at least one client terminal station, the wireless LAN base station comprising:
    a first wireless LAN module for holding the wireless communication with at least one client terminal station;
    a second wireless LAN module for holding the wireless communication with at least one client terminal station;
    determination means for determining whether the number of the client terminal stations which are holding the wireless communication with the wireless LAN base station is equal to or smaller than a predetermined number;
    first control means for controlling all of the client terminal stations which are holding the wireless communication with the wireless LAN base station to hold the wireless communication with said first wireless LAN module, controls said first wireless LAN module to be activated and controls said second wireless LAN module to be deactivated, if a determination result of the determination means is YES; and
    second control means for controlling a part of the client terminal stations which are holding the wireless communication with the wireless LAN base station to hold the wireless communication with said first wireless LAN module, controls the rest of the client terminal stations which are holding the wireless communication with the wireless LAN base station to hold the wireless communication with said second wireless LAN module and controls said first wireless LAN module and said second wireless LAN module to be activated, if said determination result is NO.

2. The wireless LAN base station according to claim 1, wherein
    said first wireless LAN module comprises a plurality of wireless communication sections based on different wireless communication systems from one another,
    said second wireless LAN module comprises a plurality of wireless communication sections based on different wireless communication systems from one another, and
    said determination means, said first control means, and said second control means operate according to each of the wireless communication systems.

3. The wireless LAN base station according to claim 2, wherein
    the different wireless communication systems are used for respective packet sizes.

4. The wireless LAN base station according to claim 2, wherein
    the different wireless communication systems are allocated for respective packet types.

5. A communication control method at a wireless LAN base station which holds wireless communication with at least one client terminal station, wherein the wireless LAN base station comprises: a first wireless LAN module for holding the wireless communication with at least one client terminal station; and a second wireless LAN module for holding the wireless communication with at least one client terminal station, and wherein the communication control method comprises the steps of:
    a determination step of determining whether the number of the client terminal stations which are holding the wireless communication with the wireless LAN base station is equal to or smaller than a predetermined number;
    a first control step of controlling all of the client terminal stations which are holding the wireless communication with the wireless LAN base station to hold the wireless communication with said first wireless LAN module, controlling said first wireless LAN module to be activated and controlling said second wireless LAN module to be deactivated, if a determination result of said determination step is YES; and
    a second control step of controlling a part of the client terminal stations which are holding the wireless communication with the wireless LAN base station to hold the wireless communication with said first wireless LAN module, controlling the rest of the client terminal stations which are holding the wireless communication with the wireless LAN base station to hold the wireless communication with said second wireless LAN module and controlling said first wireless LAN module and said second wireless LAN module to be activated, if said determination result of said determination step is NO.

6. The communication control method according to claim 5, wherein
    said first wireless LAN module comprises a plurality of wireless communication sections based on different wireless communication systems from one another,
    said second wireless LAN module comprises a plurality of wireless communication sections based on different wireless communication systems from one another, and
    said determination step, said first control step, and said second control step are executed according to each of the wireless communication systems.

7. The communication control method according to claim 6, wherein
    the different wireless communication systems are allocated for respective packet sizes.

8. The communication control method according to claim 6, wherein
    the different wireless communication systems are allocated for respective packet types.

* * * * *